United States Patent
Song et al.

(10) Patent No.: US 12,130,140 B2
(45) Date of Patent: Oct. 29, 2024

(54) METHOD AND APPARATUS FOR DETERMINING POSITIONING INFORMATION OF VEHICLE, ELECTRONIC DEVICE, STORAGE MEDIUM AND PROGRAM PRODUCT

(71) Applicant: Beijing Baidu Netcom Science Technology Co., Ltd., Beijing (CN)

(72) Inventors: Mingliang Song, Beijing (CN); Xuguang Lv, Beijing (CN); Jiantao Wu, Beijing (CN); Jianxu Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 435 days.

(21) Appl. No.: 17/498,065

(22) Filed: Oct. 11, 2021

(65) Prior Publication Data
US 2022/0026213 A1    Jan. 27, 2022

(30) Foreign Application Priority Data
Mar. 25, 2021    (CN) .......................... 202110321196.4

(51) Int. Cl.
*G01C 21/00*    (2006.01)
*G01C 21/16*    (2006.01)
(Continued)

(52) U.S. Cl.
CPC ....... *G01C 21/005* (2013.01); *G01C 21/1652* (2020.08); *G01C 21/1656* (2020.08);
(Continued)

(58) Field of Classification Search
CPC ..... G06F 17/18; G01C 21/1656; G01C 21/00; G01C 21/16; G01C 21/165;
(Continued)

(56) References Cited

U.S. PATENT DOCUMENTS 10,820,182 B1 * 10/2020 Newman ................ H04W 84/12
10,996,342 B2 *  5/2021 Kadoya .................... G01S 19/42
(Continued)

FOREIGN PATENT DOCUMENTS

CN    101135568 A    3/2008
CN    102736093 A    10/2012
(Continued)

OTHER PUBLICATIONS

Safavi S, Safavi MA, Hamid H, Fallah S. Multi-sensor fault detection, identification, isolation and health forecasting for autonomous vehicles. Sensors. Apr. 5, 2021;21(7):2547.(Year: 2021).*
(Continued)

*Primary Examiner* — Cuong H Nguyen
(74) *Attorney, Agent, or Firm* — Tucker Ellis LLP

(57) ABSTRACT

The present disclosure provides a method and an apparatus for determining positioning information of a vehicle, an electronic device, a storage medium and a computer program product, relating to the field of artificial intelligence, in particular to the field of intelligent driving. The method includes: receiving positioning results and error ranges of the positioning results from at least two positioning subsystems in a vehicle; determining reliability detection results of the positioning results of the positioning subsystems according to the error ranges of the positioning results; and determining positioning information of the vehicle according to a first positioning result of a positioning subsystem whose reliability detection result is "reliable", and determining an error range of the positioning information, where the error range of the positioning information represents a confidence level of the positioning information.

17 Claims, 4 Drawing Sheets

(51) Int. Cl.
  *G01S 17/86* (2020.01)
  *G01S 19/48* (2010.01)
  *G01S 19/49* (2010.01)
  *G06F 17/18* (2006.01)

(52) U.S. Cl.
  CPC ............ *G01S 17/86* (2020.01); *G01S 19/485* (2020.05); *G01S 19/49* (2013.01); *G06F 17/18* (2013.01)

(58) Field of Classification Search
  CPC . G01C 21/1652; G01C 21/005; G01S 19/485; G01S 19/49; G01S 19/45; G01S 19/47; G01S 19/48; G01S 17/86; G01S 5/0244; G01S 5/0263
  USPC ......................................................... 370/329
  See application file for complete search history.

(56) References Cited

U.S. PATENT DOCUMENTS

| | | | | |
|---|---|---|---|---|
| 11,573,333 | B2* | 2/2023 | Park | G06F 18/254 |
| 11,627,620 | B2* | 4/2023 | Chae | H04W 76/15 |
| | | | | 370/329 |
| 11,671,941 | B2* | 6/2023 | Lee | H04W 72/56 |
| | | | | 370/329 |
| 11,698,466 | B2* | 7/2023 | Nie | H04W 4/46 |
| | | | | 455/456.1 |
| 11,971,257 | B2* | 4/2024 | Jeon | B60W 40/02 |
| 2009/0273515 | A1 | 11/2009 | Azaola Saenz | |
| 2016/0328982 | A1* | 11/2016 | Jeong | B64D 45/04 |
| 2018/0120115 | A1* | 5/2018 | Shikimachi | G01C 21/165 |

FOREIGN PATENT DOCUMENTS

| | | | | | |
|---|---|---|---|---|---|
| CN | 104729506 | A | * | 6/2015 | ........... G01C 21/165 |
| CN | 105277917 | A | | 1/2016 | |
| CN | 106443585 | A | | 2/2017 | |
| CN | 104808220 | B | | 4/2017 | |
| CN | 108955673 | A | | 12/2018 | |
| CN | 109474894 | A | | 3/2019 | |
| CN | 110226108 | A | * | 9/2019 | ............ G01C 21/12 |
| CN | 110906923 | A | | 3/2020 | |
| CN | 111949943 | B | * | 8/2022 | .......... G01C 21/165 |
| DE | 102015010340 | A1 | * | 3/2016 | .......... B60W 40/107 |
| DE | 112016002192 | T5 | * | 1/2018 | ............ G01C 21/16 |
| EP | 3252503 | A1 | | 12/2017 | |
| JP | 2019015635 | A | * | 1/2019 | ............ G01C 21/28 |
| WO | WO-2016185659 | A1 | * | 11/2016 | ............ G01C 21/16 |
| WO | 2016/121058 | A1 | | 7/2017 | |

OTHER PUBLICATIONS

Han B, Zhang Y, Liu Y, Zhu J. An abstract for Collision avoidance warning algorithm based on spatiotemporal position prediction of vehicles at intersections. SAE International Journal of Connected and Automated Vehicles. Feb. 10, 2023;6(12-06-03-0019):297-307 (Year: 2023).*
Zhang T, Zhou L, Feng X, Shi J, Zhang Q, Niu X. INS Aided GNSS Pseudo-range Error Prediction Using Machine Learning for Urban Vehicle Navigation. IEEE Sensors Journal. Jan. 24, 2024.(Year: 2024).*
H. Lim et al."A Data-Fusion Method using Bayesian Approach to Enhance Raw Data Accuracy of Position and Distance Measurements for Connected Vehicles," 2021 IFIP/IEEE Inter Symposium on Integrated Network Management (IM), Bordeaux, France, 2021, pp. 1018-1023 (Year: 2021).*
Office Action of corresponding Chinese Application No. 2021103211964, dated Apr. 8, 2022, 9 pages.
Translation of Office Action of corresponding Chinese Application No. 2021103211964, dated Apr. 8, 2022, 9 pages.
Search Report of corresponding European Application No. 21202206.5, dated Jul. 15, 2022, 9 pages.
Notice of Reasons for Refusal from corresponding Japanese Patent Application No. 2022-027684, dated Mar. 20, 2023, 12 pages.

* cited by examiner

METHOD AND APPARATUS FOR DETERMINING POSITIONING INFORMATION OF VEHICLE, ELECTRONIC DEVICE, STORAGE MEDIUM AND PROGRAM PRODUCT

CROSS-REFERENCE TO RELATED APPLICATIONS

This application claims priority to Chinese Patent Application No. 2021103211964, filed on Mar. 25, 2021, which is hereby incorporated by reference in its entirety.

TECHNICAL FIELD

Embodiments of the present disclosure relate to the technical field of artificial intelligence and, in particular, to a method and an apparatus for determining positioning information of a vehicle, an electronic device, a storage medium and a program product, which can be used in the field of intelligent driving.

BACKGROUND

A positioning system in an intelligent driving vehicle is used to determine a position, an attitude and a speed of the current vehicle, and is an indispensable part of an intelligent driving system. Due to the limitation of the sensor performance, positioning using a single sensor cannot meet performance requirements of the intelligent driving vehicle. Usually, multiple kinds of sensors will be used to provide positioning results, and the positioning results of the sensors are fused using a multi-sensor fusion method to finally obtain positioning information.

The positioning information is related to the safety of the intelligent driving vehicle. Because the fusion of multiple sensors is involved, it is highly necessary to monitor integrity of the positioning information, and use a result of integrity monitoring to characterize whether the positioning information is reliable or not. For the integrity monitoring for the positioning information, a similarity of positioning results of multiple sensors can be calculated, and the similarity is used as an integrity index. However, such similarity index cannot be effectively combined with actual performance requirements (usually represented by a distance) of the intelligent driving vehicle, and thus cannot be directly applied to the intelligent driving vehicle.

SUMMARY

The present disclosure provides a method and an apparatus for determining positioning information of a vehicle, a storage medium and a program product, which realizes integrity monitoring of an intelligent driving vehicle.

According to an aspect of the present disclosure, a method for determining positioning information of a vehicle is provided, including:
receiving positioning results and error ranges of the positioning results from at least two positioning subsystems in a vehicle;
determining reliability detection results of the positioning results of the positioning subsystems according to the error ranges of the positioning results; and
determining positioning information of the vehicle according to a first positioning result of a positioning subsystem whose reliability detection result is "reliable", and determining an error range of the positioning information, where the error range of the positioning information represents a confidence level of the positioning information.

According to another aspect of the present disclosure, an apparatus for determining positioning information of a vehicle is provided, including:
a receiving module, configured to receive positioning results and error ranges of the positioning results from at least two positioning subsystems in a vehicle;
a reliability detection module, configured to determine reliability detection results of the positioning results of the positioning subsystems according to the error ranges of the positioning results; and
a positioning module, configured to determine positioning information of the vehicle according to a first positioning result of a positioning subsystem whose reliability detection result is "reliable", and determine an error range of the positioning information, where the error range of the positioning information represents a confidence level of the positioning information.

According to still another aspect of the present disclosure, an electronic device is provided, including:
at least one processor; and
a memory communicatively connected to the at least one processor; where,
the memory stores instructions executable by the at least one processor, and the instructions are executed by the at least one processor to enable the at least one processor to execute the method of the above first aspect.

According to yet another aspect of the present disclosure, a non-transitory computer-readable storage medium having computer instructions stored thereon is provided, where the computer instructions are used to cause a computer to execute the method of the above first aspect.

According to yet another aspect of the present disclosure, a computer program product is provided, where the program products includes a computer program, the computer program stores in a readable storage medium from which at least one processor of an electronic device is capable of reading the computer program, and the at least one processor executes the computer program to cause the electronic device to execute the method of the above first aspect.

According to the technical solutions of the present disclosure, a fusion positioning method and an integrity monitoring method which can be practically applied to an intelligent driving vehicle are realized.

It should be understood that what is described in this part is not intended to identify key or important features of embodiments of the present disclosure, nor is it intended to limit the scope of the present disclosure. Other features of the present disclosure will become easy to understand from the following description.

BRIEF DESCRIPTION OF DRAWINGS

Accompanying drawings are used to better understand the solutions, and do not constitute a limitation on the present application, among them.

DESCRIPTION OF EMBODIMENTS

Figure 1:
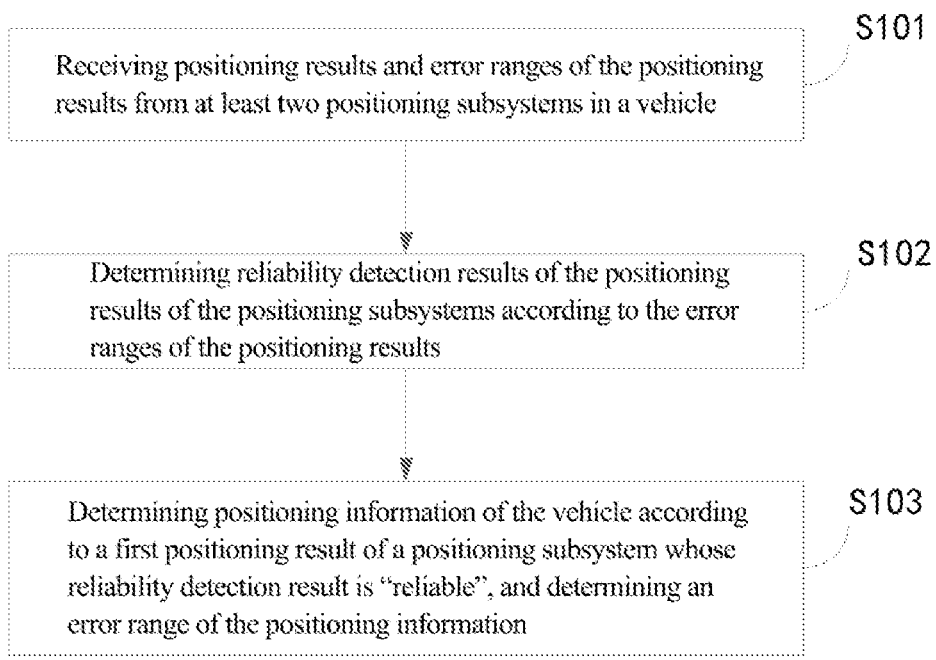
FIG. 1 is a schematic flowchart of a method for determining positioning information of a vehicle according to an embodiment of the present disclosure.

Exemplary embodiments of the present disclosure are described below with reference to the accompanying drawings, including various details of embodiments of the present disclosure to facilitate understanding, which should be regarded as merely exemplary. Therefore, those of ordinary skill in the art should recognize that various changes and modifications can be made to the embodiments described herein without departing from the scope and spirit of the present disclosure. Also, for the sake of clarity and conciseness, descriptions of well-known functions and structures are omitted in the following description.

A positioning system of an intelligent driving vehicle generally includes several positioning subsystems, such as a global navigation satellite system (Global Navigation Satellite System, GNSS), an inertial sensor (Inertial Measurement Unit, IMU), a camera positioning system, a laser radar, etc. A fusing module in the positioning system fuses positioning results of the positioning subsystems to finally obtain positioning information.

Since the positioning information is related to the safety of the intelligent driving vehicle, it is highly necessary to monitor integrity of the positioning information, and use a result of integrity monitoring to characterize whether the positioning information is reliable, so as to determine whether to use the positioning information for subsequent processing, such as driving trajectory planning, etc. For the integrity monitoring for the positioning information, a similarity of positioning results of multiple positioning subsystems can be calculated, and the similarity is used as an integrity index. The higher the similarity of the positioning results of multiple positioning subsystems, the better the integrity index, that is, the higher the reliability. However, in practical applications, performance requirements of the intelligent driving vehicle are usually represented by a distance. For example, in a lane-level positioning scenario, a positioning error is required to be less than half of the lane width. Therefore, the above-mentioned manner of using the similarity to characterize integrity cannot be directly combined with practical application scenarios and cannot be directly applied.

In order to realize the integrity monitoring of the positioning system of the intelligent driving vehicle and make an integrity monitoring result be directly combined with the performance requirements of the intelligent driving vehicle so as to be applied to actual scenarios, an error range of positioning information can be considered to characterize the integrity monitoring result, so that whether the positioning information meets the high performance requirements of the vehicle can be intuitively determined through the integrity monitoring result, where the error range may also be called a protection range. For example, the positioning subsystems send the positioning results and original redundant information of sensors of the positioning subsystems to the fusing module, and the fusing module screens the positioning results of the positioning subsystems using the original redundant information, fuses the screened positioning results to obtain positioning information, and calculates an error range of the positioning information.

More accurate final positioning information can be obtained in the above manner. By using the error range of the positioning information to characterize the integrity, whether the positioning information is reliable can be determined directly by making use of whether the integrity monitoring result meets the performance requirements of the vehicle. However, this manner has some problems, for example, the positioning subsystems need to send the original redundant information to the fusing module, which makes information fusing module too complex, amount of data calculation too large and the efficiency low. In addition, it is also not conducive to performing reliability test and verification for the positioning subsystems, respectively.

Therefore, in the following embodiments of the present disclosure, for multiple positioning subsystems in a positioning system, each positioning subsystem determines its own positioning result and calculates an error range at the same time. For a fusing module of the positioning system, the fusing module selects available positioning results for subsequent positioning fusion according to positioning results and error ranges of the positioning subsystems to obtain final positioning information and calculate an error range of the positioning information in real time. Integrity monitoring for the positioning information is realized, and an integrity monitoring result can directly match performance requirements of an intelligent driving vehicle to determine reliability of the positioning information. Moreover, the fusing module has simple calculation and relatively high efficiency.

In the following, a method for determining positioning information of a vehicle provided by the present disclosure will be explained in detail through specific embodiments. It can be understood that the following specific embodiments can be combined with each other, and the same or similar concepts or processes may not be repeated in some embodiments.

FIG. 1 is a schematic flowchart of a method for determining positioning information of a vehicle according to an embodiment of the present disclosure. An executive entity of the method is a fusing module in a positioning system of a vehicle. The method includes the following steps.

S101: receiving positioning results and error ranges of the positioning results from at least two positioning subsystems in the vehicle.

In the embodiment of the present disclosure, the positioning subsystem in the positioning system is not limited. For example, the positioning subsystem may be a GNSS, an IMU, a camera positioning system, a laser radar and the like as described in the above, which can be specifically determined according to an actual situation of the vehicle. The fusing module in the positioning system receives the positioning results and the error ranges of the positioning results sent by the positioning subsystems, where a frequency of sending the positioning result and the error range of the positioning result by each positioning subsystem may be different, and a specific sending frequency is determined by the positioning subsystem.

In the embodiment of the present disclosure, there is no limitation on the manner in which the positioning subsystems determine the positioning results, and the positioning subsystems can determine the positioning results according to sensor information and the like using a method in the prior art, respectively. In addition, the positioning subsystems can also use redundant sensor information to estimate the error ranges of the positioning results. For example, the GNSS uses satellite pseudo-ranges and pseudo-range rates to solve a positioning result, including a position and a speed, and at the same time estimates an error range according to redundant pseudo-range information. In another example, the camera positioning subsystem uses identified image features to match with a map to obtain a position estimation, and at the same time uses redundant features to estimate an error range.

In some embodiments, the positioning results and the error ranges of the positioning results may be periodically received from at least two positioning subsystems in the vehicle.

S102: determining reliability detection results of the positioning results of the positioning subsystems according to the error ranges of the positioning results.

An error range of each positioning subsystem can represent reliability of the positioning result of this positioning subsystem, or can also be called a confidence level. The smaller the error range of the positioning result of the positioning subsystem, the higher the reliability, and the larger the error range of the positioning result, the lower the reliability. The fusing module can determine whether the positioning result of the positioning subsystem is reliable by making comparison and judgment on the error range of the positioning result.

S103: determining positioning information of the vehicle according to a first positioning result of a positioning subsystem whose reliability detection result is "reliable", and determining an error range of the positioning information.

The error range of the positioning information represents a confidence level of the positioning information.

Among the positioning results of the positioning subsystems, a positioning result of a positioning system whose reliability detection result is "reliable" is called the first positioning result. For a positioning result of an unreliable positioning subsystem, the fusing module can discard it, and only fuse and process the first positioning result of the reliable positioning subsystem to obtain the positioning information of the vehicle, so as to avoid the positioning result of the unreliable positioning subsystem affecting final positioning accuracy. For example, the fusing module fuses the first positioning result of the reliable positioning subsystem using an extended Kalman filter or optimization method to obtain the positioning information of the vehicle, and estimates the error range according to the positioning information. For example, on the premise that an error of the positioning information conforms to Gaussian distribution, if a probability that the error is larger than an error upper bound is smaller than a set probability value, the error upper bound is taken as a boundary of the error range, thus determining a protection range of the positioning information.

After determining the error range of the positioning information, the fusing module can also determine whether to use the positioning information according to whether the error range of the positioning information meets performance requirements of the vehicle. If the error range of the positioning information meets the performance requirements of the vehicle, the positioning information is used; if the error range of the positioning information does not meet the performance requirements of the vehicle, the positioning information is discarded, and the positioning information is re-determined according to the positioning results and the error ranges of the positioning results that are re-sent by the positioning subsystems.

In the embodiment of the present disclosure, the positioning subsystems in the positioning system determine their own positioning results and error ranges of the positioning results, and send them to the fusing module; the fusing module determines, according to the positioning results and the error ranges of the positioning subsystems, reliable positioning results for subsequent positioning fusion to obtain final positioning information, and calculates the error range of the positioning information in real time, thus realizing integrity monitoring of the positioning information; and an integrity monitoring result can directly match performance requirements of an intelligent driving vehicle. In addition, for the fusing module, only the positioning results and the error ranges of the positioning results of the positioning subsystems are needed, and other redundant information is not needed, so the calculation is simple and the efficiency is relatively high. At the same time, for the positioning subsystems, they can also be tested and verified separately, which is beneficial to a decoupling design of a complex system.

On the basis of the above embodiment, the method for determining positioning information of a vehicle according to the embodiment of the present disclosure will be further explained with reference to FIG. 2, in which only two positioning subsystems are taken as examples.

Figure 2:
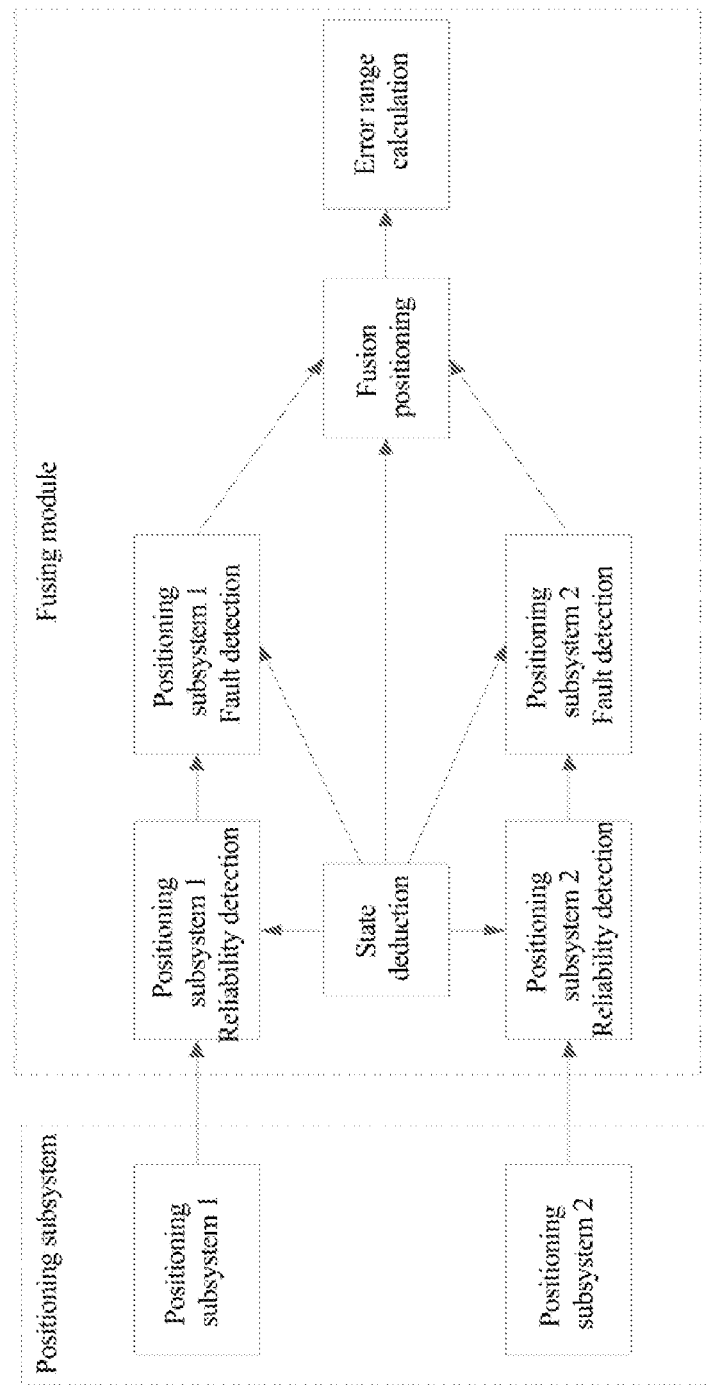
FIG. 2 is a schematic diagram of a positioning system of a vehicle according to an embodiment of the present disclosure.

As shown in FIG. 2, the positioning subsystems send the positioning results and the error ranges of the positioning results to the fusing module. The fusing module determines the reliable first positioning result among the positioning results of the positioning subsystems according to the error ranges of the positioning results of the positioning subsystems, and further performs fault detection on the positioning subsystem corresponding to the first positioning result to obtain a fault detection result; and finally fuses a second positioning result of a positioning subsystem whose fault detection result is "no fault" to obtain the positioning information of the vehicle and the error range of the positioning information.

It has been explained in the foregoing that the positioning subsystems send the positioning results and the error ranges of the positioning results to the fusing module according to their own periods, thus the fusing module may receive the positioning results and the error ranges of the positioning results of different positioning subsystems at the same time or at different times. Therefore, the fusing module can output fused positioning information once and determine the error range of the positioning information, after each time receiving a positioning result and an error range of the positioning result of a positioning subsystem that passes reliability detection and fault detection. A preset range here may be the performance requirements of the vehicle and may be set as required.

If the error range of the positioning information is not within the preset range, it is determined that the positioning information is unavailable, and the positioning system is initialized again, that is, information sent by the positioning subsystems is re-acquired for fusion positioning. If the error range of the positioning information is within the preset range, the positioning information can be used, and the fusing module can deduce a vehicle state according to the positioning information and motion information of the vehicle, that is, updating the fused positioning information using the motion information of the vehicle, and re-determine the error range of the updated positioning information to obtain the positioning information closer to the real position of the vehicle and the corresponding error range.

Figure 3:
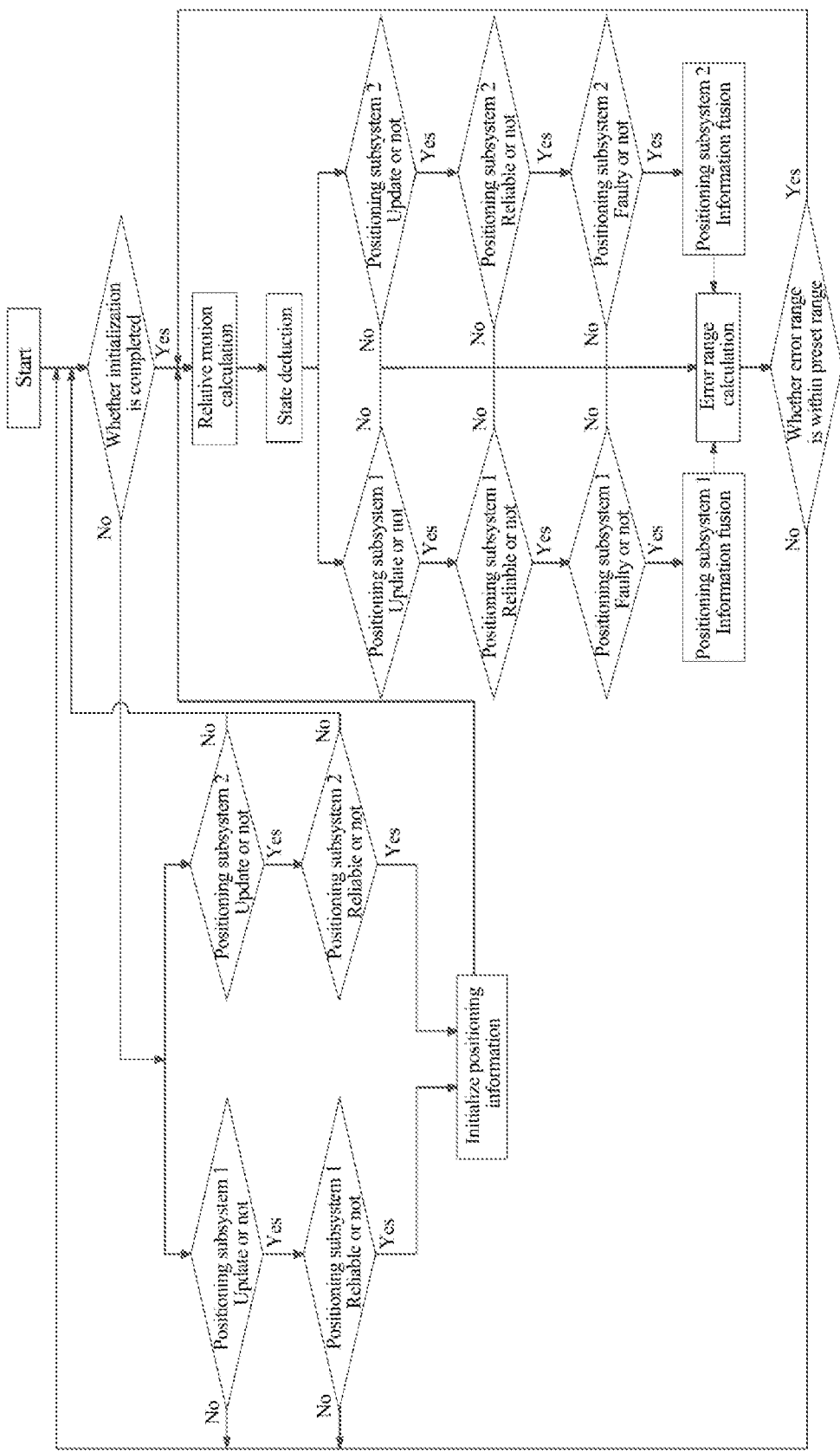
FIG. 3 is a schematic flowchart of positioning according to an embodiment of the present disclosure.

In combination with FIG. 3, in a case that the positioning result and the error range of any one subsystem are determined to be reliable, or in a case that the positioning results and the error ranges of all subsystems are determined to be reliable, it can be determined that initialization is completed and initialized positioning information is obtained. For a case after initialization, the fusing module updates positioning information of last time according to the motion information, that is, state deduction. In a case that the positioning result and the error range of any positioning subsystem are determined to be reliable and faultless, the second positioning result of the reliable and faultless positioning subsystem is fused with the positioning information obtained after updating the positioning information obtained last time, so as to obtain new positioning information, and the error range of the positioning information is calculated. If the error range of the positioning information is within the preset range, the state deduction can be performed again, and the positioning results and the error ranges of the positioning subsystems can be acquired repeatedly to execute the above process; if the error range of the positioning information is not within the preset range, the positioning information is discarded and initialization is performed again.

In combination with the above process, how to perform reliability detection of the positioning result of the positioning subsystem is explained according to situations.

In a scenario, in a case that the vehicle is initialized or the error range of the positioning information obtained last time is not within the preset range, the error range of the positioning result is compared with the preset range; and if the error range of the positioning result is within the preset range, the reliability detection result of the positioning result is determined to be "reliable".

In another scenario, in a case that the error range of the positioning information obtained last time is within the preset range, the error range of the positioning result is compared with a first range, where the first range is obtained by updating the error range of the positioning information obtained last time, that is, an error range after going through the state deduction; and if the error range of the positioning result intersects with the first range, the reliability detection result of the positioning result is determined to be "reliable".

Through the reliability detection of the positioning subsystems, it is ensured that all the positioning results of the positioning subsystems can meet the performance requirements of the intelligent driving vehicle, and the fusion positioning is carried out based on the positioning results that meet the performance requirements, which makes the final fused positioning information more reliable.

How to perform fault detection on the positioning subsystem is further explained. The embodiments of the present disclosure do not specifically limit a method for fault detection. For example, a residual chi-square detection method can be used, it is determined that there is a fault in the positioning result when a fault detection factor is greater than a set threshold, otherwise, it is determined that there is no fault. An abnormal positioning result is eliminated by the fault detection, and the positioning accuracy is improved.

In a feasible implementation, the fusing module determines a fault detection result of the positioning subsystem corresponding to the first positioning result, according to the first positioning result and a standard error of the positioning subsystem corresponding to the first positioning result, as well as positioning information and error range that are obtained after updating the positioning information obtained last time and the error range of the positioning information obtained last time.

The standard error of the positioning subsystem may be predetermined. For example, the GNSS can have a predetermined standard error according to its positioning accuracy. The positioning information obtained last time and the error range of the positioning information obtained last time are updated, that is, the state deduction is performed on the positioning information and the error range of the positioning information according to the motion information as described above. The fusing module can subtract the first positioning result and the positioning information obtained after the state deduction from one another to obtain a difference value, and judge whether the difference value is within a range of a sum of the standard error of the positioning subsystem and the error range of the positioning information obtained after the state deduction; and if so, the positioning subsystem is determined to be "no fault". The use of the error of the positioning subsystem and the error range of the positioning information to perform fault judgment on the positioning result of positioning subsystem avoids a positioning result with an excessive error participating in the subsequent fusion calculation and ensures the positioning accuracy.

In another feasible implementation, the fusing module acquires a historical positioning result of the positioning subsystem corresponding to the first positioning result; and determines the fault detection result of the positioning subsystem corresponding to the first positioning result according to the first positioning result and the historical positioning result.

For example, historical positioning results may be a certain number of positioning results before the current positioning result. Due to the continuity of vehicle running, positioning results of each positioning subsystem should conform to certain rules according to the running speed and direction of the vehicle. For example, the fusing module can estimate a position of the vehicle according to the historical positioning results of the positioning subsystem and the motion information of the vehicle, and compare the estimated result with the first positioning result. If a deviation is too large, it is determined that the positioning subsystem corresponding to the first positioning result is faulty. Fault detection of the positioning subsystem through the historical positioning results can ensure the continuity and accuracy of the positioning results of the positioning subsystem.

After the reliability detection and fault detection are carried out on the positioning results of the positioning subsystems and the error ranges of the positioning results by adopting any of the above methods, the second positioning result which is determined to be reliable and faultless is fused with the positioning information obtained after the state deduction to obtain the positioning information, and the error range of the positioning information is determined at the same time. In a feasible implementation, a covariance matrix of the positioning information can also be calculated while determining the positioning information, where the covariance matrix is a covariance of components of various dimensions in multidimensional positioning information. When determining the error range of the positioning information, the error range of the positioning information can be determined using a variance of components of one or more dimensions in the covariance matrix, for example, the variance is multiplied by a preset coefficient to obtain an error upper bound, where the preset coefficient can be obtained in advance through experiments or theoretical calculations. In another feasible implementation, a sum of three items including an absolute value of a difference value between the second positioning result and the positioning information obtained after the state deduction, a product of a standard error of the second positioning result and a preset coefficient, and a product of a standard error of the positioning information obtained after the state deduction and a preset coefficient can be used as the error range of the positioning information, where the standard error of the positioning information obtained after the state deduction can be determined according to the covariance matrix of the positioning information obtained after the state deduction.

Figure 4:
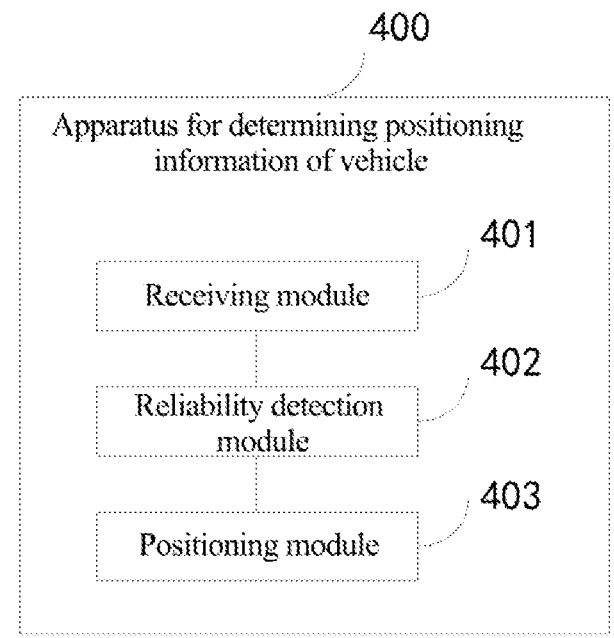
FIG. 4 is a schematic structural diagram of an apparatus for determining positioning information of a vehicle according to an embodiment of the present disclosure.

FIG. 4 is a schematic structural diagram of an apparatus for determining positioning information of a vehicle according to an embodiment of the present disclosure. As shown in FIG. 4, an apparatus 400 for determining positioning information of a vehicle includes:

a receiving module 401, configured to receive positioning results and error ranges of the positioning results from at least two positioning subsystems in a vehicle;

a reliability detection module 402, configured to determine reliability detection results of the positioning results of the positioning subsystems according to the error ranges of the positioning results; and a positioning module 403, configured to determine positioning information of the vehicle according to a first positioning result of a positioning subsystem whose reliability detection result is "reliable", and determine an error range of the positioning information, where the error range of the positioning information represents a confidence level of the positioning information.

In an implementation, the positioning module 403 includes:

a fault detection module, configured to perform fault detection on the positioning subsystem corresponding to the first positioning result to obtain a fault detection result; and a positioning unit, configured to fuse a second positioning result of a positioning subsystem whose fault detection result is "no fault" to obtain the positioning information of the vehicle.

In an implementation, the reliability detection module 402 includes:

a first comparing unit, configured to: in a case that the vehicle is initialized or an error range of positioning information obtained last time is not within a preset range, compare the error ranges of the positioning results with the preset range; and a first determining unit, configured to: if an error range of a positioning result is within the preset range, determine that a reliability detection result of the positioning result is "reliable".

In an implementation, the reliability detection module 402 includes:

a second comparing unit, configured to: in a case that an error range of positioning information obtained last time is within a preset range, comparing the error ranges of the positioning results with a first range, where the first range is obtained by updating the error range of the positioning information obtained last time; and a second determining unit, configured to: if an error range of a positioning result intersects with the first range, determine that a reliability detection result of the positioning result is "reliable".

In an implementation, the fault detection module includes:

a first acquiring unit, configured to acquire a historical positioning result of the positioning subsystem corresponding to the first positioning result; and a third determining unit, configured to determine the fault detection result of the positioning subsystem corresponding to the first positioning result according to the first positioning result and the historical positioning result.

In an implementation, the fault detection module includes:

a forth determining unit, configured to: determine the fault detection result of the positioning subsystem corresponding to the first positioning result, according to the first positioning result and a standard error of the positioning subsystem corresponding to the first positioning result as well as positioning information and an error range that are obtained after updating the positioning information obtained last time and an error range of the positioning information obtained last time.

In an implementation, the positioning module 403 includes:

a fusing unit, configured to fuse the second positioning result with positioning information obtained after updating positioning information obtained last time to obtain the positioning information of the vehicle.

In an implementation, the apparatus further includes:

a second acquiring unit, configured to acquire motion information of the vehicle; and an updating unit, configured to update the positioning information and the error range of the positioning information according to the motion information.

The apparatus in the embodiment of the present disclosure can be used to execute the method for determining positioning information of a vehicle in the above method embodiments, and implementation principles and technical effects thereof are similar, which thus will not be repeated here.

According to embodiments of the present disclosure, the present disclosure also provides an electronic device and a non-transitory computer-readable storage medium storing computer instructions.

According to an embodiment of the present disclosure, the present disclosure also provides a computer program product. The program product includes: a computer program stored in a readable storage medium, from which at least one processor of an electronic device is capable of reading the computer program, and the at least one processor executes the computer program to cause the electronic device to execute the solution provided by any of the above embodiments.

Figure 5:
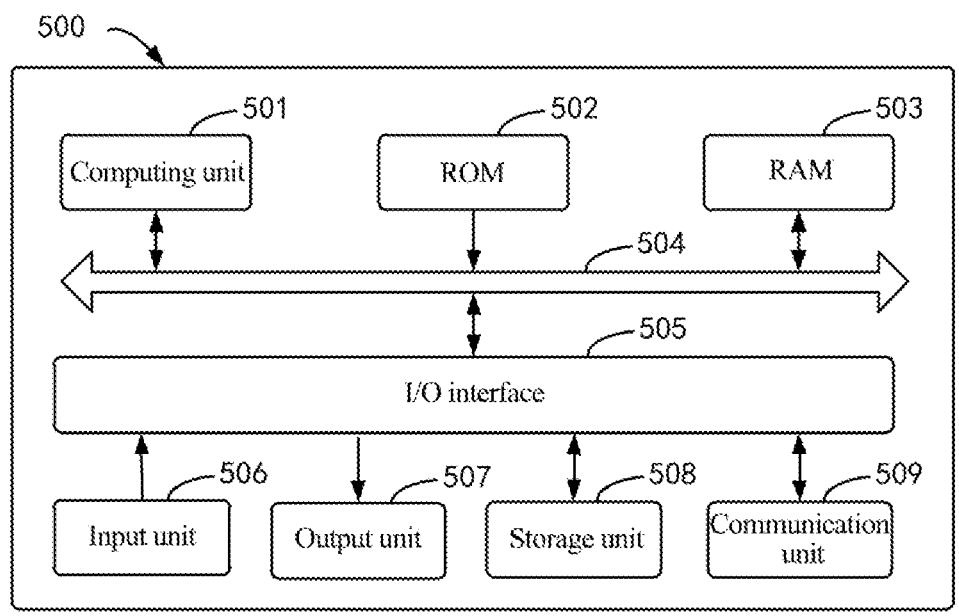
FIG. 5 is a schematic block diagram of an electronic device used to implement a method for determining positioning information of a vehicle according to an embodiment of the present disclosure.

FIG. 5 is a schematic block diagram of an electronic device used to implement a method for determining positioning information of a vehicle according to an embodiment of the present disclosure. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile apparatuses, such as a personal digital assistant, a cellular phone, a smart phone, a wearable device and other similar computing apparatuses. The components shown herein, their connections and relationships, as well as their functions are merely examples, and are not intended to limit the implementation of the present disclosure described and/or claimed herein As shown in FIG. 5, an electronic device 500 includes a computing unit 501, which can execute various appropriate actions and processing according to a computer program stored in a read-only memory (ROM) 502 or a computer program loaded from a storage unit 508 into a random access memory (RAM) 503. In the RAM 503, various programs and data required for operations of the device 500 can also be stored. The computing unit 501, the ROM 502, and the RAM 503 are connected to each other through a bus 504. An input/output (I/O) interface 505 is also connected to the bus 504.

Many components in the device 500 are connected to the I/O interface 505, including: an input unit 506, such as a keyboard, a mouse, etc.; an output unit 507, such as various types of displays, speakers, etc.; the storage unit 508, such as a magnetic disk, an optical disk, etc.; and a communication unit 509, such as a network card, a modem, a wireless communication transceiver, etc. The communication unit 509 allows the device 500 to exchange information/data with other devices through a computer network such as the Internet and/or various telecommunication networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units running machine learning model algorithms, a digital signal processor (DSP), and any suitable processor, controller, microcontroller, etc. The computing unit 501 executes various methods and processing described above, such as a method for determining positioning information of a vehicle. For example, in some embodiments, the method for determining positioning information of a vehicle can be implemented as a computer software program, which is tangibly embodied in a machine-readable medium, such as the storage unit 508. In some embodiments, part or all of a computer program may be loaded and/or installed on the device 500 via the ROM 502 and/or the communication unit 509. When the computer program is loaded into the RAM 503 and executed by the computing unit 501, one or more steps of the method for determining positioning information of a vehicle described above may be executed. Alternatively, in other embodiments, the computing unit 501 may be configured to execute the method for determining positioning information of a vehicle through any other suitable manner (for example, by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system on a chip (SOC), a complex programmable logic device (CPLD), computer hardware, firmware, software, and/or combinations thereof. These various implementations may include: being implemented in one or more computer programs that can be executed and/or interpreted on a programmable system including at least one programmable processor, where the programmable processor can be a special-purpose or general-purpose programmable processor, and can receive data and instructions from, and transmit data and instructions to, a storage system, at least one input apparatus, and at least one output apparatus.

Program codes for implementing the method of the present disclosure can be written in any combination of one or more programming languages. These program codes may be provided to a processor or controller of a general-purpose computer, a special-purpose computer, or other programmable data processing apparatus, such that the program codes, when executed by the processor or controller, cause functions/operations specified in the flowcharts and/or block diagrams to be implemented. The program codes can be executed completely on a machine, partially on the machine, partially on the machine as an independent software package and partially on a remote machine, or completely on a remote machine or a server.

In the context of the present disclosure, a machine-readable medium may be a tangible medium that may contain or store a program for use by, or use in connection with, an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include electrical connections based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

To provide interaction with a user, the systems and techniques described herein can be implemented on a computer having; a display apparatus (e.g., a CRT (Cathode Ray Tube) or LCD (Liquid Crystal Display) monitor) for displaying information to the user; and a keyboard and a pointing apparatus (e.g., a mouse or a trackball) through which the user can provide inputs to the computer. Other kinds of apparatuses can also be used to provide interaction with the user. For example, a feedback provided to the user can be any form of sensory feedback (for example, visual feedback, auditory feedback, or tactile feedback); and inputs from the user can be received in any form (including acoustic inputs, voice inputs or tactile inputs).

The systems and techniques described herein can be implemented in a computing system including back-end components (e.g., as a data server), a computing system including middleware components (e.g., an application server), or a computing system including front-end components (e.g., a user computer with a graphical user interface or a web browser through which a user can interact with embodiments of the systems and techniques described herein), or a computing system including any combination of such background components, middleware components or front-end components. Components of the system can be connected to each other through digital data communication in any form or medium (e.g., a communication network). Examples of the communication network include a local area network (LAN), a wide area network (WAN), and the Internet.

A computer system can include a client and a server. The client and the server are generally far away from each other and usually interact through a communication network. A relationship between the client and the server is generated by computer programs running on corresponding computers and having a client-server relationship with each other. The server can be a cloud server, also known as a cloud computing server or a cloud host, which is a host product in a cloud computing service system, to solve defects of difficult management and weak business scalability in a traditional physical host and VPS service ("Virtual Private Server", or VPS for short). The server can also be a server of a distributed system or a server combined with a blockchain.

It should be understood that steps may be reordered, added or deleted for the various forms of processes shown above. For example, the steps described in the present application can be performed in parallel, sequentially, or in a different order, as long as desired results of the technical solutions disclosed in the present disclosure can be realized, which is not limited herein.

The above specific implementations do not constitute a limitation on the protection scope of the present disclosure. Those skilled in the art should understand that various modifications, combinations, sub-combinations and substitutions can be made according to design requirements and other factors. Any amendments, equivalent substitutions, improvements and the like that are made within the spirit and principles of the present disclosure shall be included within the protection scope of the present disclosure.

The invention claimed is:

1. A computer-implemented method for determining positioning information of a vehicle, comprising:
receiving positioning results and error ranges of the positioning results from at least two positioning subsystems in a vehicle;
determining reliability detection results of the positioning results of the positioning subsystems according to the error ranges of the positioning results; and
determining positioning information of the vehicle according to a first positioning result of a positioning subsystem whose reliability detection result is "reliable", and determining an error range of the positioning information, wherein the error range of the positioning information represents a confidence level of the positioning information;
wherein the determining the reliability detection results of the positioning results of the positioning subsystems according to the error ranges of the positioning results comprises:
in a case that an error range of positioning information obtained last time is within a preset range, comparing the error ranges of the positioning results with a first range, wherein the first range is obtained by updating the error range of the positioning information obtained last time; and
if there is an intersection between an error range of a positioning result and the first range, determining that a reliability detection result of the positioning result is "reliable".

2. The method according to claim 1, wherein the determining the positioning information of the vehicle according to the first positioning result of the positioning subsystem whose reliability detection result is "reliable" comprises:
performing fault detection on the positioning subsystem corresponding to the first positioning result to obtain a fault detection result; and
fusing a second positioning result in the first positioning result of the positioning subsystem corresponding to a positioning subsystem whose fault detection result is "no fault", to obtain the positioning information of the vehicle.

3. The method according to claim 1, wherein the determining the reliability detection results of the positioning results of the positioning subsystems according to the error ranges of the positioning results further comprises:
in a case that the vehicle is initialized or an error range of positioning information obtained last time is not within a preset range, comparing the error ranges of the positioning results with the preset range; and
if an error range of a positioning result is within the preset range, determining that a reliability detection result of the positioning result is "reliable".

4. A non-transitory computer-readable storage medium having computer instructions stored thereon, wherein the computer instructions are used to cause a computer to:
receive positioning results and error ranges of the positioning results from at least two positioning subsystems in a vehicle;
determine reliability detection results of the positioning results of the positioning subsystems according to the error ranges of the positioning results; and
determine positioning information of the vehicle according to a first positioning result of a positioning subsystem whose reliability detection result is "reliable", and determine an error range of the positioning information, wherein the error range of the positioning information represents a confidence level of the positioning information;
wherein the computer instructions are used to cause the computer to:
in a case that an error range of positioning information obtained last time is within a preset range, compare the error ranges of the positioning results with a first range, wherein the first range is obtained by updating the error range of the positioning information obtained last time; and
if there is an intersection between an error range of a positioning result and the first range, determine that a reliability detection result of the positioning result is "reliable".

5. The method according to claim 2, wherein the performing the fault detection on the positioning subsystem corresponding to the first positioning result to obtain the fault detection result comprises:
acquiring a historical positioning result of the positioning subsystem corresponding to the first positioning result; and
determining the fault detection result of the positioning subsystem corresponding to the first positioning result according to the first positioning result and the historical positioning result.

6. The method according to claim 2, wherein the performing the fault detection on the positioning subsystem corresponding to the first positioning result to obtain the fault detection result comprises:
determining the fault detection result of the positioning subsystem corresponding to the first positioning result, according to the first positioning result and a standard error of the positioning subsystem corresponding to the first positioning result as well as positioning information and an error range that are obtained after updating positioning information obtained last time and an error range of the positioning information obtained last time.

7. The method according to claim 2, wherein the fusing the second positioning result in the first positioning result of the positioning subsystem corresponding to the positioning subsystem whose fault detection result is "no fault" to obtain the positioning information of the vehicle comprises:
fusing the second positioning result with positioning information obtained after updating positioning information obtained last time, to obtain the positioning information of the vehicle.

8. The method according to claim 1, further comprising:
acquiring motion information of the vehicle; and
updating the positioning information and the error range of the positioning information according to the motion information.

9. An apparatus for determining positioning information of a vehicle, comprising:

at least one processor, and a memory communicatively connected to the at least one processor;

wherein the memory stores instructions executable by the at least one processor, and the instructions are executed by the at least one processor to enable the at least one processor to:

receive positioning results and error ranges of the positioning results from at least two positioning subsystems in a vehicle;

determine reliability detection results of the positioning results of the positioning subsystems according to the error ranges of the positioning results; and determine positioning information of the vehicle according to a first positioning result of a positioning subsystem whose reliability detection result is "reliable", and determine an error range of the positioning information, wherein the error range of the positioning information represents a confidence level of the positioning information;

wherein the at least one processor is further enabled to:

in a case that an error range of positioning information obtained last time is within a preset range, compare the error ranges of the positioning results with a first range, wherein the first range is obtained by updating the error range of the positioning information obtained last time; and if there is an intersection between an error range of a positioning result and the first range, determine that a reliability detection result of the positioning result is "reliable".

10. The apparatus according to claim 9, wherein the at least one processor is further enabled to:

perform fault detection on the positioning subsystem corresponding to the first positioning result to obtain a fault detection result; and fuse a second positioning result in the first positioning result of the positioning subsystem corresponding to a positioning subsystem whose fault detection result is "no fault", to obtain the positioning information of the vehicle.

11. The apparatus according to claim 9, wherein the at least one processor is further enabled to:

in a case that the vehicle is initialized or an error range of positioning information obtained last time is not within a preset range, compare the error ranges of the positioning results with the preset range; and if an error range of a positioning result is within the preset range, determine that a reliability detection result of the positioning result is "reliable".

12. The non-transitory computer-readable storage medium according to claim 4, wherein the computer instructions are used to cause the computer to:

in a case that the vehicle is initialized or an error range of positioning information obtained last time is not within a preset range, compare the error ranges of the positioning results with the preset range; and if an error range of a positioning result is within the preset range, determine that a reliability detection result of the positioning result is "reliable".

13. The apparatus according to claim 10, wherein the at least one processor is further enabled to:

acquire a historical positioning result of the positioning subsystem corresponding to the first positioning result; and determine the fault detection result of the positioning subsystem corresponding to the first positioning result according to the first positioning result and the historical positioning result.

14. The apparatus according to claim 10, wherein the at least one processor is further enabled to:

determine the fault detection result of the positioning subsystem corresponding to the first positioning result, according to the first positioning result and a standard error of the positioning subsystem corresponding to the first positioning result as well as positioning information and an error range that are obtained after updating positioning information obtained last time and an error range of the positioning information obtained last time.

15. The apparatus according to claim 10, wherein the at least one processor is further enabled to:

fuse the second positioning result with positioning information obtained after updating positioning information obtained last time, to obtain the positioning information of the vehicle.

16. The apparatus according to claim 9, wherein the at least one processor is further enabled to:

acquire motion information of the vehicle; and update the positioning information and the error range of the positioning information according to the motion information.

17. The non-transitory computer-readable storage medium according to claim 4, wherein the computer instructions are used to cause the computer to:

perform fault detection on the positioning subsystem corresponding to the first positioning result to obtain a fault detection result; and fuse a second positioning result in the first positioning result of the positioning subsystem corresponding to a positioning subsystem whose fault detection result is "no fault", to obtain the positioning information of the vehicle.

* * * * *